Figure 1:
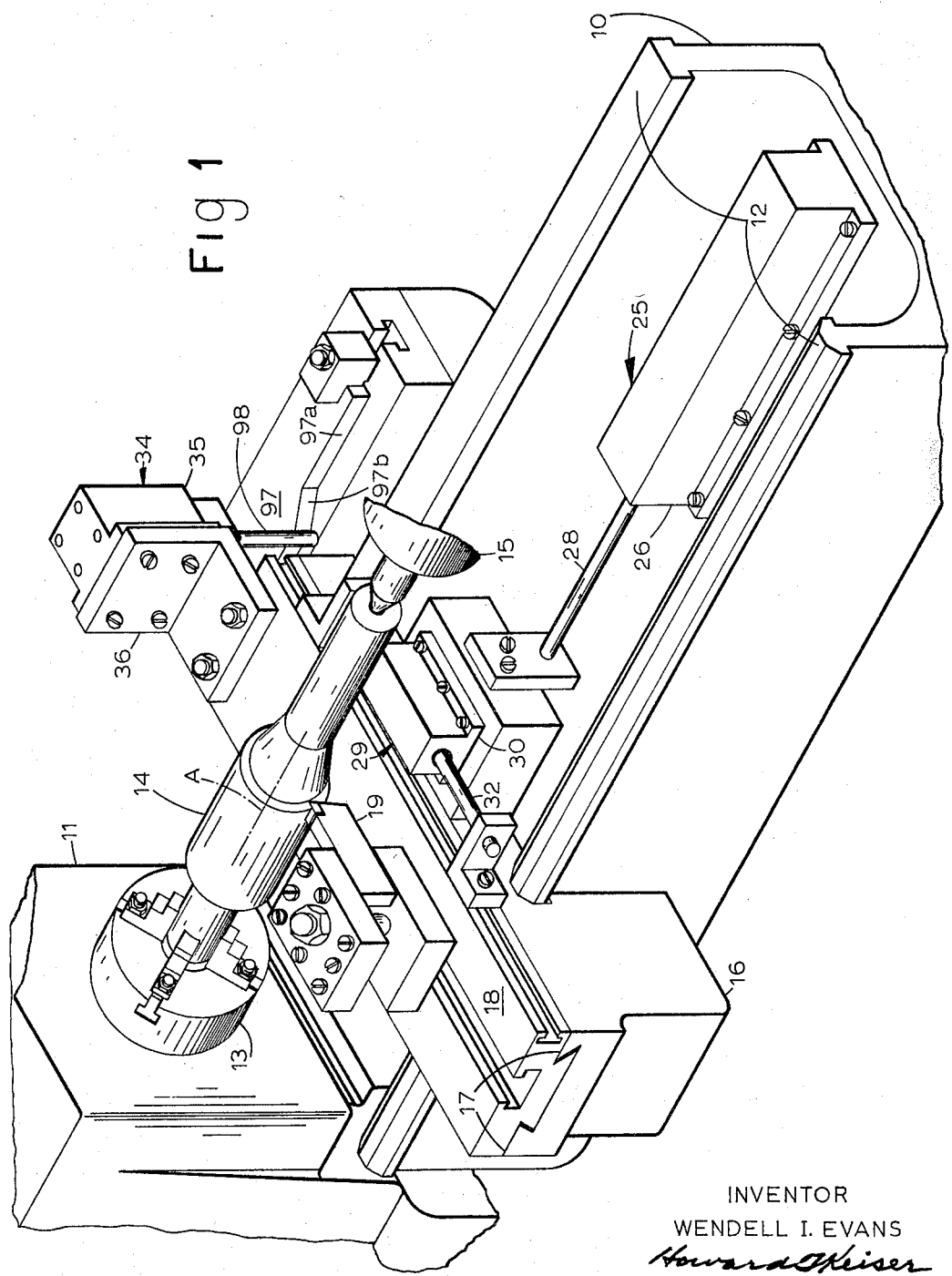

United States Patent Office 3,286,599
Patented Nov. 22, 1966

3,286,599
TRACING MECHANISM FOR AMPLIFIED FLOW
Wendell I. Evans, Cincinnati, Ohio, assignor to The Cincinnati Milling Machine Co., Cincinnati, Ohio, a corporation of Ohio
Filed Feb. 12, 1964, Ser. No. 344,441
6 Claims. (Cl. 91—36)

The present invention relates to tracer mechanism particularly suitable for large machine tools.

In a tracer controlled machine tool, relative movement between a cutting tool and a workpiece is effected by two or more relatively movable slides which are controlled by a stylus engaged with a pattern, or template. For example, in a typical tracer system for a lathe, a first slide is provided with a first hydraulic motor for longitudinal movement on the base and a second slide is mounted on the first slide and is provided with a second hydraulic motor for cross, or transverse, movement on the first slide. A tool mounted on the second slide moves along, and to the form, the axis of a rotating workpiece mounted on the base in response to deflection of a stylus mounted on the second slide and engaged with a template mounted on the base. In a conventional system, the stylus is engaged with a movable valve member of the tracer valve which controls the two hydraulic slide motors.

For large machines, large hydraulic slide motors are required which need a large flow of oil to effect any given movement of the slides. In the present invention, mechanism is provided which permits greater oil flow to and from the hydraulic slide motors, without increasing the extent of deflection of the stylus and without increasing the force required to deflect the stylus.

It is therefore the object of the present invention to provide tracer mechanism in which a large flow of oil through the system is possible. Other objects and advantages of the present invention should be readily apparent by reference to the following specification, considered in conjunction with the accompanying drawings froming a part thereof, and it is to be understood that any modifications may be made in the exact structural details there shown and described, within the scope of the appended claims, without departing from or exceeding the spirit of the invention.

Figure 2:
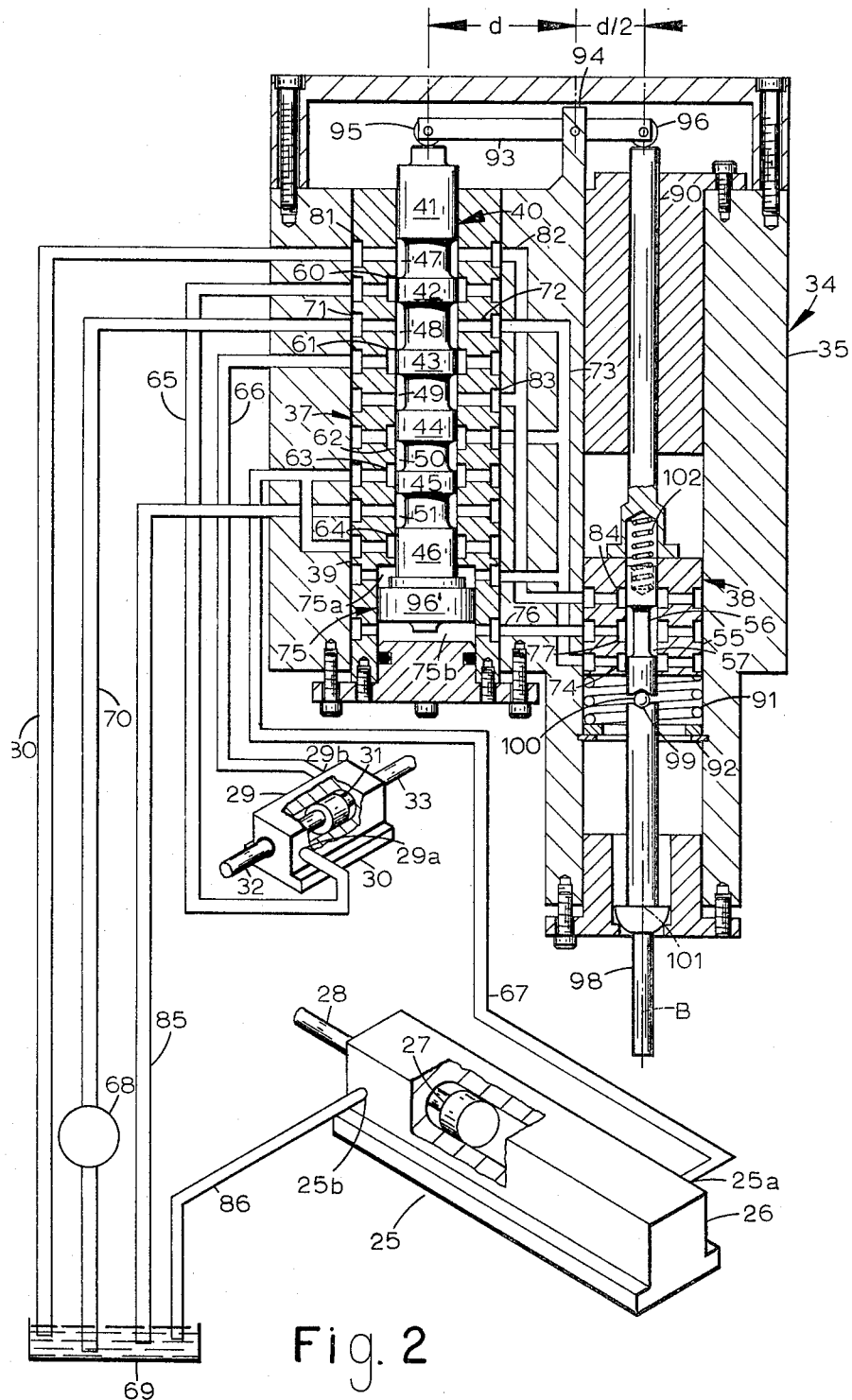

In the drawings:

FIG. 1 is a fragmentary view in perspective of a lathe incorporating the present invention; and FIG. 2 is a somewhat schematic view of the tracer system of the machine tool of FIG. 1 showing an enlarged view in cross section of the tracer valve.

There is shown in FIG. 1 the base 10 of a machine tool, or lathe, having a headstock 11 and having ways 12 extending forwardly from the headstock. A rotating chuck 13 on the headstock grips one end of a workpiece 14, the other end of which is supported by a tailstock 15 mounted on the ways 12. A carriage, or slide, 16 is mounted on ways 12 for longitudinal or axial movement (that is, for movement parallel to the longitudinal axis A of the workpiece 14). Slide 16 has ways 17 extending transverse to ways 12 to receive a second carriage, or upper slide, 18 for lateral, or radial, movement with respect to workpiece 14. The upper slide 18 has a cutting tool 19 secured thereto and positioned thereon for cutting engagement with the workpiece 14.

Longitudinal movement of slide 16 is effected by a hydraulic motor 25, comprising cylinder 26 connected to base 10 and a piston 27 slidably received in cylinder 26. Piston 27 is connected through piston rod 28 to slide 16. Lateral movement of slide 18 is effected by a hydraulic motor 29, comprising cylinder 30 connected to slide 16 and a piston 31 slidably received in cylinder 30. Piston 31 is connected through piston rods 32 and 33 to slide 18.

Control of the two motors 25 and 29 is effected by the tracer mechanism indicated generally at 34. A housing 35, secured by bracket 36 to upper slide 18, has a main valve 37 and a pilot valve 38 therein as shown in FIG. 2. Main valve 37 has a valve bushing, or sleeve, 39 secured in housing 35 against axial movement. The sleeve 39 slidably receives therein a movable valve member, or plunger, 40 having valve spools 41, 42, 43, 44, 45, and 46 thereon. Between the plunger spools, and defined thereby, are annular fluid passages 47 (between spools 41 and 42), 48 (between spools 42 and 43), 49 (between spools 43 and 44), 50 (between spools 44 and 45), and 51 (between spools 45 and 46).

Pilot valve 38 has a valve member constituting a bushing, or sleeve, 55 slidably received in housing 35 for axial movement therein. A plunger 56 is slidably received in valve bushing 55 and has an annular passage 57 thereon.

The main valve bushing has internal annular grooves 60, 61, 62, 63, and 64 defining ports which are controlled, respectively, by the spools 42, 43, 44, 45, and 46. Ports 60 and 61 are connected, respectively, through lines 65, 66 to opposite sides 29a, 29b of hydraulic motor 29. Ports 63, 64 are both connected, through line 67, to side 25a of motor 25.

A fluid pump 68 takes hydraulic fluid from sump 69 and delivers it under pressure to pressure line 70. Pressure line 70 is connected to an annular external groove 71 in the main valve bushing 39 which is in continuous communication through radial bushing passages 72 with annular plunger passage 48. Groove 71 is connected to a line 73 which, in turn, is connected to an annular internal groove 74 in the pilot valve bushing 55. Line 73, which receives fluid from pressure line 71 and also defines a pressure line, is connected to main valve port 62 and to the upper end 75a of a chamber 75 in the main valve bushing 39. The lower end 75b of the chamber is connected by line 76 to a pilot valve port 77 which is in continuous communication with the pilot valve plunger passage 57.

A return line 80 extends between the sump 69 and an external annular groove 81 in the main valve bushing 39 which is in continuous communication with annular plunger passage 47. Groove 81 is connected to a return line 82 which is connected to external annular groove 83 in the main valve bushing and internal annular groove 84 in the pilot valve bushing 55. Groove 83 is in continuous communication with the annular passage 49 of main valve plunger 40. Another return line 85 is connected to the main valve for continuous communication with main valve plunger passage 51. Line 86 leads from side 25b of motor 25 to sump 69. For the sake of simplicity, only so much of the hydraulic system is shown which is necessary to drive motor 25 in one direction under the control of the tracer valve. It will be understood that in an actual system means (not shown) must be provided to drive the motor 25 in the opposite direction for return of slide 16 and tool 19 to a starting position.

A rod 90 is secured to the pilot valve bushing 55 and the bushing 55, and rod 90, are urged upwardly in housing 35 by spring 91 which is held in the housing by snap ring 92. A rocker, or lever, arm 93 is pivotally connected to the housing 35 at 94 and has, at each end, a roller 95, 96. The rollers 95, 96 are in registration with the upper ends of main valve plunger 40 and the upper end of rod 90, respectively, the distance of roller 95 (in registration with the upper end of main valve plunger 40) from pivot axis 94 being greater than (say, for example, double) the distance of roller 96 (in registration with the upper end of rod 90) from axis 94. The main valve plunger 40 has a piston 96' connected thereto which is received in chamber 75. The area of piston 96' exposed to pressure at end 75b is greater than (say, for example, double) the area of piston 96' exposed to pressure at end 75a of chamber 75. A greater fluid pressure at end 75b than at end 75a of the chamber will urge the piston 96', and valve plunger 40, upwardly. With both the main valve plunger 40 and the rod 90 (connected to pilot valve bushing 55) urged into lever 93, the pilot valve bushing will assume a particular position in housing 35 for a particular position of the main valve plunger.

The pilot valve plunger 56 is moved, in accordance with the conformation of a template 97 which is connected to base 10, through a stylus 98 pivotally mounted in housing 35 below plunger 56. The upper end of stylus 98 and the lower end of plunger 56 each have a conical recess 99, and a ball 100 is received between the plunger and stylus in these recesses. Engagement of the lower end of stylus 98 with template 97 causes pivotal movement, or tilt, of the stylus about a pivot point 101, and pivotal movement of the stylus (in any direction) causes an axial movement of plunger 56. Plunger 56 is biased toward the stylus 98 by a light spring 102 received between the plunger 56 and the upper end of pilot valve bushing 55.

Assume stylus 98 is engaged with surface 97a of template 97 and is tilted slightly from the vertical axis B which passes through pivot point 101. At this time the pilot valve bushing 55 and the pilot valve plunger 56 are in null relationship with the passage 57 centered with respect to end ports 74 and 84 and in communication therewith (that is, the annular orifice opening between groove 74 and passage 57 and the annular orifice opening between groove 84 and passage 57 are equal). Since groove 74 is connected to pump 68 (through line 70, groove 71, and line 73) and groove 84 is connected to the sump (through line 82, groove 81, and line 80), the pressure in passage 57 is at a value midway between the pressure outlet of pump 68 and the atmospheric pressure at sump 69. For purposes of simplification, atmospheric pressure, and the upward force exerted by spring 91, will both be considered zero. Based on these assumptions, and assuming the area of piston 96' exposed to pressure at the upper end of chambe 75a to be one-half the area of piston 96' exposed to the pressure at the bottom end of chamber 75, the forces acting on piston 96' will be balanced and the main valve member 40 will be held in an axial position where spools 42 and 43 block grooves 60 and 61. Thus lines 65 and 66 are blocked, blocking both sides of motor 29, so that there is no lateral movement of slide 18, nor of tool 19 and stylus 98 carried thereby. One side 25b of motor 25 is connected to exhaust and the other side, 25a, is connected through line 67 to groove 63 which, at this time, is connected to pressure line 73 through annular passage 50. Thus motor 25 is operating to move slide 16 to the left as viewed in FIG. 1. This moves the stylus 98 along the template surface 97a and moves the tool 19 along the workpiece 14.

When the stylus reaches template surface 97b, it is deflected further about pivot point 101, raising the pilot valve plunger 56 above a position of null relationship with pilot valve bushing 55. Thus, the opening at pressure port 74 is reduced and the opening at exhaust port 84 is increased, lowering the pressure in passage 57 and in the lower end 75b of chamber 75. Since the pressure in the upper end 75a of chamber 75 remains unaffected, piston 96 and the main valve plunger 40 connected thereto moves downwardly. The downward movement of main valve plunger 40 rocks lever 93 to permit elevation of pilot valve bushing 55 by the spring 91. The upward movement of bushing 55 continues until a null relationship is reestablished between pilot valve bushing 55 and the pilot valve plunger 56, thereby restoring the pressure in passage 57 to a value of one half the pump pressure. Thus, again, the pressure forces on piston 96' are balanced and downward movement of main valve plunger 40 ceases. It will be noted that, assuming the distance $d$ from point 94 to roller 95 to be twice the distance $d/2$ from point 94 to roller 96, a ratio of 2, the main valve plunger 40 will move twice the distance the pilot valve bushing 55 moved before equilibrium is restored. Since the movement of pilot valve bushing 55 equals the movement of pilot valve plunger produced by stylus 98, the main valve plunger will move twice the distance in response to the pilot valve than it would move if it were connected directly to the stylus for movement thereby.

The downward movement of main valve plunger 40 serves to connect side 29a of motor 29, which communicates through line 65 with groove 60, to return line 80 through annular passage 47. At the same time, side 29b of motor 29, which communicates through line 66 with grove 61, is connected to pressure line 70 through passage 48. At the same time, the opening between spool 44 and groove 62 is reduced, reducing the passage between side 25a of motor 25 and pressure line 73. Thus slide 16 slows in its movement to left (FIG. 1) and slide 18 commences movement (toward the viewer of FIG. 1), causing stylus 98 to follow surface 97b and cutter 19 to move the stylus 98.

What is claimed is:
1. Tracer mechanism comprising:
   (a) a main valve having a movable valve member,
   (b) a pilot valve having two relatively movable members,
   (c) a stylus connected to one of said pilot valve members for displacement thereof,
   (d) means responsive to the displacement of said one pilot valve member to initiate movement of the movable member of the main valve,
   (e) and means responsive to movement of the movable valve member of the main valve member to move said other movable valve member of said pilot valve to terminate movement of said main valve member.
2. Tracer mechanism for operation of two slide motors in response to conformation of a template,
   (a) a stylus mounted for engagement with the template,
   (b) a pilot valve having two relatively movable valve members, one of said valve members connected to the stylus for movement thereby,
   (c) a main valve having a movable valve member, said main valve hydraulically connected to the pilot valve for the application of fluid pressure forces to the movable valve member of the main valve, said movable valve member of the main valve mechanically connected to the other movable valve member of the pilot valve.
3. In a tracer control system
   (a) a first member having a template mounted thereon,
   (b) a second member having a stylus mounted thereon,
   (c) a pair of slide motors to effect universal movement in a plane between said members,
   (d) a pilot valve mounted on said second member and operated by the stylus,
   (e) a main valve mounted on said second member and operated by the pilot valve,
   (f) a feedback element connecting said main valve with said pilot valve,
   (g) and means responsive to operation of said main valve to operate said motors.
4. A copying machine comprising in combination:
   (a) a first member,
   (b) a second member,
   (c) a pair of motors operable to effect universal movement in a plane between said members,
   (d) a template mounted on one of said members,
   (e) a tracing mechanism mounted on the other of said members, said tracing mechanism comprising,
      (1) a main valve hydraulically connected to said motors,

(2) a pilot valve operatively connected to said main valve, (3) and a stylus connected to said pilot valve and extending therefrom for engagement with the template.

5. Mechanism for controlling the movement between two machine members comprising in combination:

(a) a source of fluid under pressure, (b) a hydraulic motor connected to each of said machine members for movement thereof, (c) a template carried by one of said machine members and a tracer mechanism carried by the other machine member, said tracer mechanism comprising (1) a main valve having a movable valve member to control said motors, said main valve having a pair of fluid pressure chambers in communication with the movable valve member, (2) a pilot valve connected between the source of fluid under pressure and said chambers, said pilot valve having two movable valve members operable when in predetermined relation to effect a balance of pressure forces on the movable valve member of the main valve, (3) a stylus adapted to engage the template, said stylus connected to one of said pilot valve members for displacement thereof to disturb said fluid pressure balance and move the movable valve member of the main valve, and (4) a lever connecting the movable valve member of the main valve to the other movable valve member of the pilot valve to reestablish said predetermined relation between said movable pilot valve members on movement of the movable valve member of the main valve.

6. In a tracer mechanism, the combination comprising:

(a) a main valve having a movable valve plunger and having a fluid pressure chamber in communication with said main valve plunger, (b) a stylus, (c) a pilot valve having a movable sleeve and a movable plunger slidably received in the sleeve, said sleeve connected to the main valve plunger and said pilot valve plunger connected to the stylus, (d) and means including a source of fluid under pressure in communication with the pilot valve and a passage extending between the pilot valve and said fluid pressure chamber of the main valve to establish a pressure in said fluid pressure chamber in accordance with the position of said pilot valve plunger with respect to said pilot valve sleeve.

References Cited by the Examiner

UNITED STATES PATENTS 2,079,720   5/1937   Shaw _____ 91—36 X
3,053,280   9/1962   Waterson _____ 251—3

EDGAR W. GEOGHEGAN, *Primary Examiner.*